US009790852B2

(12) United States Patent
Ito et al.

(10) Patent No.: US 9,790,852 B2
(45) Date of Patent: Oct. 17, 2017

(54) CONDENSED WATER TREATMENT DEVICE FOR INTERNAL COMBUSTION ENGINE

(71) Applicant: TOYOTA JIDOSHA KABUSHIKI KAISHA, Toyota-shi, Aichi-ken (JP)

(72) Inventors: Hisaki Ito, Gotenba (JP); Noriyuki Takada, Susono (JP); Takeshi Hashizume, Mishima (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/894,022

(22) PCT Filed: Jun. 12, 2013

(86) PCT No.: PCT/JP2013/066270
§ 371 (c)(1),
(2) Date: Nov. 25, 2015

(87) PCT Pub. No.: WO2014/199475
PCT Pub. Date: Dec. 18, 2014

(65) Prior Publication Data
US 2016/0115861 A1  Apr. 28, 2016

(51) Int. Cl.
*F01N 3/02* (2006.01)
*F01N 3/00* (2006.01)
(Continued)

(52) U.S. Cl.
CPC .............. *F02B 47/02* (2013.01); *F01N 3/005* (2013.01); *F01N 3/0205* (2013.01); *F01N 9/00* (2013.01);
(Continued)

(58) Field of Classification Search
CPC ........ F01N 3/005; F01N 3/0205; F01N 3/021; F01N 3/0814; F01N 3/082; F01N 3/0842;
(Continued)

(56) References Cited

U.S. PATENT DOCUMENTS 6,367,256 B1    4/2002  McKee
7,302,795 B2 *  12/2007 Vetrovec .................. F01N 5/02
                                                        60/274
(Continued)

FOREIGN PATENT DOCUMENTS

EP    3 009 635 A1    4/2016
JP    10-318049       12/1998
(Continued)

OTHER PUBLICATIONS

Office Action issued in U.S. Appl. No. 14/897,193 on Sep. 15, 2016.
(Continued)

*Primary Examiner* — Phutthiwat Wongwian
*Assistant Examiner* — Diem Tran
(74) *Attorney, Agent, or Firm* — Finnegan, Henderson, Farabow, Garrett & Dunner, LLP (57) ABSTRACT

A condensed water treatment device for an internal combustion engine is provided. The condensed water treatment device may include a condensed water tank, a condensed water supply device, and a condensed-water generation quantity controlling device. The condensed water treatment device may further include a computer. The computer by executing a computer program may function as a storage-water-quantity decrease controlling device and a storage-water-quantity increase controlling device.

2 Claims, 5 Drawing Sheets

(51) Int. Cl.
| | | |
|---|---|---|
| *F02B 47/02* | (2006.01) | |
| *F02M 26/28* | (2016.01) | |
| *F01N 9/00* | (2006.01) | |
| *F02D 41/00* | (2006.01) | |
| *F01P 7/14* | (2006.01) | |
| *F02M 26/35* | (2016.01) | |
| *F01N 3/08* | (2006.01) | |
| *F01N 3/021* | (2006.01) | |
| *F01N 13/00* | (2010.01) | |
| *F02M 26/29* | (2016.01) | |

(52) U.S. Cl.
CPC ............ *F01P 7/14* (2013.01); *F02D 41/0025* (2013.01); *F02M 26/28* (2016.02); *F02M 26/35* (2016.02); *F01N 3/021* (2013.01); *F01N 3/0814* (2013.01); *F01N 3/0821* (2013.01); *F01N 3/0842* (2013.01); *F01N 13/0097* (2014.06); *F01N 2240/02* (2013.01); *F01N 2240/22* (2013.01); *F01N 2410/00* (2013.01); *F01N 2570/22* (2013.01); *F01N 2900/08* (2013.01); *F01P 2007/146* (2013.01); *F02M 26/29* (2016.02); *Y02T 10/121* (2013.01); *Y02T 10/20* (2013.01)

(58) Field of Classification Search
CPC ............ F01N 2240/02; F01N 2240/22; F01N 2410/00; F01N 2570/22; F01N 2900/08; F01N 13/0097; F01N 9/00; F02M 26/28; F02M 26/29; F02M 26/35; F02B 47/02; F02B 41/0025; Y02T 10/20; Y02T 10/121
USPC .......................................... 60/278, 309, 298
See application file for complete search history.

(56) References Cited

U.S. PATENT DOCUMENTS

| | | | |
|---|---|---|---|
| 7,845,167 B2* | 12/2010 | Miyagawa | ............... F01N 5/02 123/41.13 |
| 8,250,856 B2* | 8/2012 | Ohashi | .................. B01D 53/90 60/286 |
| 2005/0223700 A1 | 10/2005 | Abe | |
| 2005/0247052 A1 | 11/2005 | Kobayashi et al. | |
| 2007/0214774 A1 | 9/2007 | Higuchi | |
| 2010/0192550 A1 | 8/2010 | Tsujimoto et al. | |
| 2011/0011084 A1 | 1/2011 | Yanagida et al. | |
| 2012/0085146 A1 | 4/2012 | Maeda et al. | |
| 2012/0090584 A1 | 4/2012 | Jung | |
| 2013/0298883 A1 | 11/2013 | Archer et al. | |
| 2013/0333638 A1 | 12/2013 | Nishida et al. | |
| 2016/0138451 A1 | 5/2016 | Takada et al. | |
| 2016/0146163 A1 | 5/2016 | Takada et al. | |
| 2016/0153376 A1 | 6/2016 | Katayama et al. | |
| 2016/0153406 A1 | 6/2016 | Takada et al. | |

FOREIGN PATENT DOCUMENTS

| | | | |
|---|---|---|---|
| JP | 11-82182 A | | 3/1999 |
| JP | 2008-280945 | | 11/2008 |
| JP | 2009-68477 A | | 4/2009 |
| JP | 2010-48107 | | 3/2010 |
| JP | 2012-87779 A | | 5/2012 |
| JP | 2012-127327 | * | 7/2012 |
| JP | 2012-163061 | | 8/2012 |
| JP | 2012-189022 | | 10/2012 |
| JP | 2012-215142 | | 11/2012 |
| WO | WO 2009/071439 A1 | | 6/2009 |
| WO | WO 2011/149459 A1 | | 12/2011 |

OTHER PUBLICATIONS

Final Office Action issued in U.S. Appl. No. 14/897,193 dated Feb. 16, 2017.

Notice of Allowance issued in U.S. Appl. No. 14/897,193 dated Jun. 9, 2017.

* cited by examiner

CONDENSED WATER TREATMENT DEVICE FOR INTERNAL COMBUSTION ENGINE

CROSS-REFERENCE TO RELATED APPLICATIONS

This application is a national phase application of International Application No. PCT/JP2013/066270, filed Jun. 12, 2013, the content of which is incorporated herein by reference.

TECHNICAL FIELD

The present invention relates to a condensed water treatment device for an internal combustion engine, where condensed water generated in an exhaust system of the internal combustion engine is treated.

BACKGROUND ART

As a condensed water treatment device for an internal combustion engine, known is the one which stores, in a condensed water tank, condensed water generated in an EGR cooler included in an exhaust system, and injects the condensed water to an intake passage when the storage water quantity of the condensed water tank reaches a predetermined quantity (Patent Literature 1). The condensed water supplied to the intake passage is led into a cylinder with intake gas to vaporize. Thereby, the combustion temperature is suppressed. As a result of that, the generation quantity of NOx because of combustion is suppressed. In addition, as literatures of prior art relating to the present invention, there are Patent Documents 2 and 3.

CITATION LIST

Patent Literature

PTL1: JP-A-H10-318049
PTL2: JP-A-2008-280945
PTL3: JP-A-2012-189022

SUMMARY OF INVENTION

Technical Problem

For utilizing the condensed water stored in the condensed water tank, it is necessary to manage appropriately the storage water quantity of the condensed water tank.

Then, the present invention aims to provide a condensed water treatment device for an internal combustion engine capable of managing appropriately a storage water quantity of in a condensed water tank.

Solution to Problem

A condensed water treatment device according to one aspect of the present invention is a condensed water treatment device for an internal combustion engine, the condensed water treatment device comprising: a condensed water tank which stores condensed water generated in an exhaust system of the internal combustion engine; a condensed water supply device which supplies the condensed water stored in the condensed water tank to the internal combustion engine or a related device relating to the internal combustion engine; a condensed-water generation quantity controlling device capable of controlling a generation quantity of the condensed water generated in the exhaust system; a storage-water-quantity decrease controlling device which is configured to control at least one of the condensed water supply device and the condensed-water generation quantity controlling device so that when a storage water quantity of the condensed water tank is more than a predetermined value the storage water quantity decreases; and a storage-water-quantity increase controlling device which is configured to control at least one of the condensed water supply device and the condensed-water generation quantity controlling device so that when the storage water quantity is equal to or less than the predetermined value the storage water quantity increases.

According to the condensed water treatment device of the present invention, the condensed water supply device supplies the condensed water to the internal combustion engine or the related device whereby the condensed water in the condensed water tank is consumed. Due to this, the storage water quantity changes in a direction to decrease the storage water quantity. Further, the condensed-water generation quantity controlling device controls the generation quantity of the condensed water whereby the storage water quantity of the condensed water tank changes in a direction to increase the storage water quantity. By controlling at least one of the condensed water supply device and the condensed-water generation quantity controlling device, it is possible to make the storage water quantity change so that in a case where the storage water quantity of the condensed water tank is more than the predetermined value the storage water quantity decreases, and also in a case where the storage water quantity of the condensed water tank is equal to or less than the predetermined value the storage water quantity increases. Accordingly, by setting the predetermined value as appropriate, it is possible to manage appropriately the storage water quantity of the condensed water tank.

In one embodiment of the condensed water treatment device of the present invention, the storage-water-quantity decrease controlling device may be configured to control the condensed water supply device in such a direction that consumption of the condensed water increases and also control the condensed-water generation quantity controlling device in such a direction that the generation quantity of the condensed water generated in the exhaust system decreases, in a case where the storage water quantity is more than the predetermined value, and the storage-water-quantity increase controlling device may be configured to control the condensed water supply device in such a direction that the consumption of the condensed water decreases and also control the condensed-water generation quantity controlling device in a direction that the generation quantity of the condensed water generated in the exhaust system increases, in a case where the storage water quantity is equal to or less than the predetermined value. According to this embodiment, in a case where the storage water quantity of the condensed water tank is more than the predetermined value, the consumption of the condensed water changes in a direction to increase the consumption and the generation quantity of the condensed water changes in a direction to decrease the generation quantity. Accordingly, when the storage water quantity of the condensed water tank should be decreased, it is possible to promote the decrease. On the other hand, in a case where the storage water quantity of the condensed water tank is equal to or less than the predetermined value, the consumption of the condensed water changes in a direction to decrease the consumption and the generation quantity of the condensed water changes in a direction to increase the generation quantity. Accordingly, when the storage water quantity of the condensed water tank should be increased, it is possible to promote the increase.

As long as the generation quantity of the condensed water generated in the exhaust system can be controlled, there is no special limitation with respect to a concrete configuration of the condensed-water generation quantity controlling device.

For example, in the above embodiment, the internal combustion engine may have an EGR passage leading exhaust gas flowing through the exhaust system to an intake system as EGR gas and an EGR cooler cooling the EGR gas, the condensed water tank may store condensed water generated in the EGR cooler as the condensed water generated in the exhaust system, the condensed-water generation quantity controlling device may include: a bypass passage leading the EGR gas to make the EGR gas bypass the EGR cooler; and a flow rate allotment changing valve capable of changing allotment of flow rate of the EGR gas between flow rate of the bypass passage and flow rate of the EGR cooler, the storage-water-quantity decrease controlling device may be configured to control the condensed water supply device so that the condensed water is supplied to the internal combustion engine or the related device and also control the flow rate allotment changing valve so that the allotment of flow rate is changed to a state that the flow rate of the EGR cooler is less than the flow rate of the bypass passage, in a case where the storage water quantity is more than the predetermined value, and the storage-water-quantity increase controlling device may be configured to control the condensed water supply device so that supply of the condensed water to the internal combustion engine or the related device is inhibited or supply quantity of the condensed water decreases and also control the flow rate allotment changing valve so that the allotment of flow rate is changed to a state that the flow rate of the EGR cooler is more than the flow rate of the bypass passage, in a case where the storage water quantity is equal to or less than the predetermined value.

The condensed water is supplied to the internal combustion engine whereby the consumption of condensed water in the condensed water tank increases. Further, the allotment of flow rate of EGR gas is changed to a state that the flow rate of the EGR cooler is less than the flow rate of the bypass passage whereby the generation quantity of condensed water decreases. According to the above construction, in a case where the storage water quantity of the condensed water tank is more than the predetermined value, theses operations are executed so that the consumption increases and the generation quantity of condensed water decreases. Accordingly, in a case where the storage water quantity of the condensed water tank should be decreased, it is possible to promote the decrease. On the other hand, it is inhibited to supply condensed water to the internal combustion engine whereby the consumption of condensed water in the condensed water tank decreases. Further, the allotment of flow rate of EGR gas is changed to a state that the flow rate of the EGR cooler is more than the flow rate of the bypass passage whereby the generation quantity of condensed water increases. According to the above construction, in a case where the storage water quantity of the condensed water tank is equal to or less than the predetermined value, these operations are executed whereby the generation quantity of condensed water increases while the consumption of condensed water decreasing. Accordingly, in a case where the storage water quantity of the condensed water tank should be increased, it is possible to promote the increase.

In addition, in this embodiment, the internal combustion engine may further comprise an exhaust passage which is connected with the EGR passage and leads exhaust gas, and the EGR cooler and the bypass passage may be respectively provided further upstream of the exhaust passage than a connecting position of the EGR passage and the exhaust passage. In this case, by operating the flow rate allotment changing valve, it is possible to lead to the EGR cooler, EGR gas before flowing into the EGR passage, that is, full quantity of the exhaust gas. Thereby, it is possible to enhance the collection rate of condensed water generated in the EGR cooler.

For example, in the above mentioned embodiment, the internal combustion engine may comprise: an engine main body; an EGR passage which leads exhaust gas flowing through the exhaust system to an intake system as EGR gas; an EGR cooler which cools the EGR gas; a radiator which cools refrigerant having passed through the engine main body; and a cooling system may include a low temperature pathway for leading to the EGR cooler, the refrigerant having passed through the radiator after passing through the engine main body and a high temperature pathway for leading to the EGR cooler, the refrigerant having bypassed the radiator after passing through the engine main body, the condensed water tank may store condensed water generated in the EGR cooler as the condensed water generated in the exhaust system, the condensed-water generation quantity controlling device may include a pathway switching valve included in the cooling system, the pathway switching valve switching between the low temperature pathway and the high temperature pathway, a cooling pathway for leading the refrigerant to the EGR cooler, the storage-water-quantity decrease controlling device may be configured to control the pathway switching valve so that the cooling pathway is switched to the high temperature pathway, in a case where the storage water quantity is more than the predetermined value, and the storage-water-quantity increase controlling device may be configured to control the pathway switching valve so that the cooling pathway is switched to the low temperature pathway, in a case where the storage water quantity is equal to or less than the predetermined value.

The cooling pathway is switched to the high temperature pathway whereby the refrigerant having high temperature is led to the EGR cooler. Thereby, the generation quantity of the condensed water decreases. According to the above construction, in a case where the storage water quantity of the condensed water tank is more than the predetermined value, the cooling pathway is switched to the high temperature pathway whereby the generation quantity of condensed water decreases. Therefore, in a case where the storage water quantity of the condensed water tank should be decreased, it is possible to promote the decrease. On the other hand, the cooling pathway is switched to the low temperature pathway whereby the refrigerant having low temperature is led to the EGR cooler. Thereby, the generation quantity of the condensed water increases. According to the above construction, in a case where the storage water quantity of the condensed water tank is equal to or less than the predetermined value, the cooling pathway is switched to the low temperature pathway whereby the generation quantity of condensed water increases. Therefore, in a case where the storage water quantity of the condensed water tank should be increased, it is possible to promote the increase.

In addition to the above constructions, the following constructions may be added. That is, the condensed-water generation quantity controlling device may further include a bypass passage leading the EGR gas to make the EGR gas bypass the EGR cooler and a flow rate allotment changing valve capable of changing allotment of flow rate between flow rate of the bypass passage and flow rate of the EGR cooler, the condensed-water-quantity decrease controlling device may be configured to control the condensed water supply device so that the condensed water is supplied to the internal combustion engine or the related device and also control the flow rate allotment changing valve so that the allotment of flow rate is changed to a state that the flow rate of the EGR cooler is less than the flow rate of the bypass passage, in a case where the storage water quantity is more than the predetermined value, and the condensed-water-quantity increase controlling device may be configured to control the condensed water supply device so that supply of the condensed water to the internal combustion engine or the related device is inhibited or supply quantity of the condensed water decreases and also control the flow rate allotment changing valve so that the allotment of flow rate is changed to a state that the flow rate of the EGR cooler is more than the flow rate of the bypass passage, in a case where the storage water quantity is equal to or less than the predetermined value. According to this embodiment, in a case where the storage water quantity of the condensed water tank is more than the predetermined value it is possible to enhance the effect that the decrease of storage water quantity is promoted, and also in a case where the storage water quantity of the condensed eater tank is equal to or less than the predetermined value it is possible to enhance the effect that the increase of storage water quantity is promoted.

In addition, in the present invention, controlling the consumption of condensed water in a direction to increase the consumption includes a case that the condensed water is not consumed, that is, a case that it is inhibited to supply the condensed water to the internal combustion engine or the related device. Supply of condensed water to the internal combustion engine includes not only supply of condensed water to the intake system or the exhaust system in the internal combustion engine, but also supply of condensed water to various devices mounted to the internal combustion engine. Further, supply of condensed water to the related device means supply of condensed water to various devices which relate to the internal combustion engine but not directly relate to combustion of the internal combustion engine.

DESCRIPTION OF EMBODIMENTS

A First Embodiment

Figure 1:
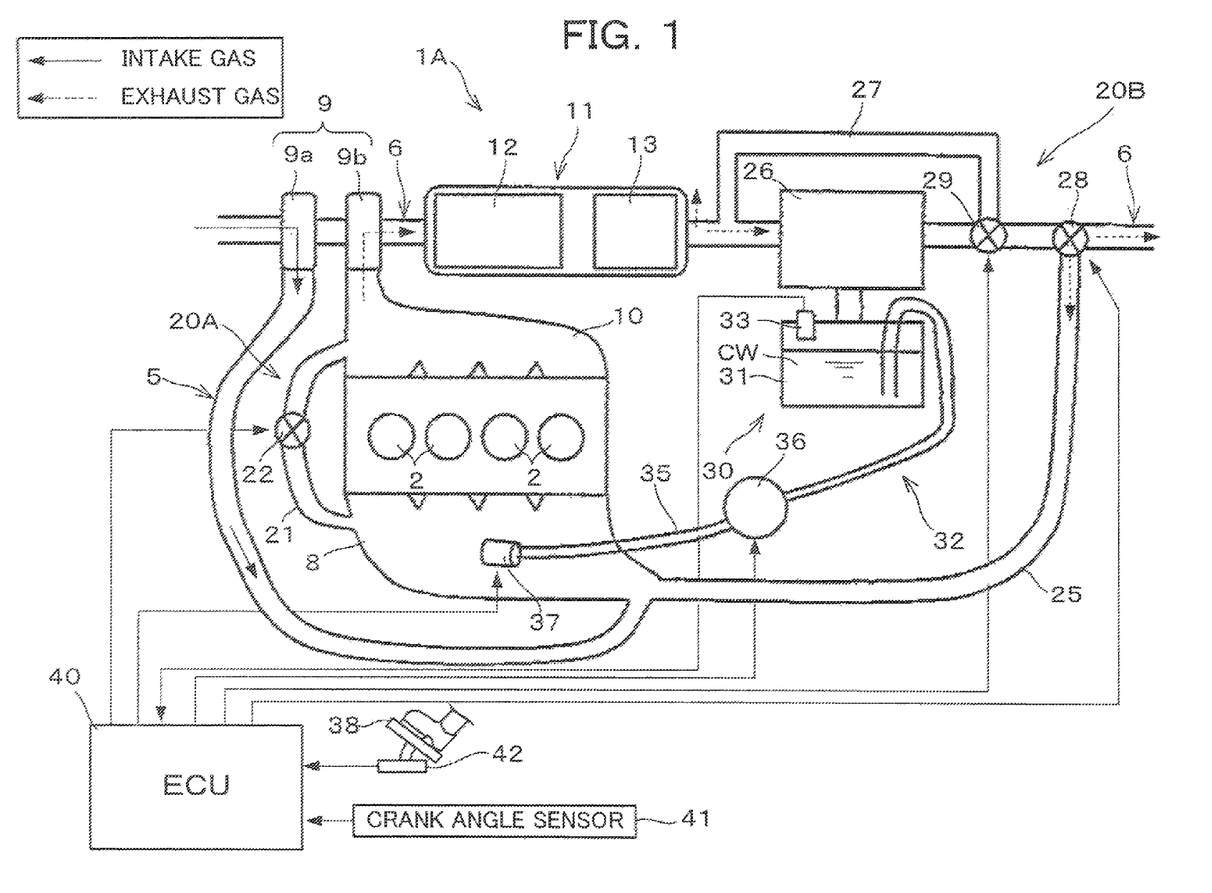
FIG. 1 is a diagram showing a whole configuration of an internal combustion engine where applied is a condensed water treatment device according to a first embodiment of the present invention.

As shown in FIG. 1, an internal combustion engine 1A is configured as a four-cylinder type in line diesel engine in which four cylinders 2 are arranged along a straight line. The internal combustion engine 1A is mounted as a drive source for traveling of, for example, a car. Fuel is directly injected into each cylinder 2 of the internal combustion engine 1A by a fuel injection valve not illustrated. The fuel injected into the cylinder 2 is self-ignited and burned in a compression stroke. An intake passage 5 and an exhaust passage 6 are connected with each cylinder 2. The air led into the intake passage 5 is filled in each cylinder 2 in an intake stroke. The intake passage 5 includes an intake manifold 8 branching off for each cylinder 2. At an upstream side of the intake manifold 8, a compressor 9a of a turbocharger 9 is provided. The exhaust passage 6 includes an exhaust manifold 10 collecting exhaust gas from each cylinder 2. At a downstream side of the exhaust manifold 10, a turbine 9b of the turbocharger 9 is provided. At the downstream side of the turbine 9b, an exhaust purification device 11 which purifies harmful materials included in the exhaust gas is provided. The exhaust purification device 11 has a diesel particulate filter (DPF) 12 and an occlusion-reduction type NOx catalyst 13. The diesel particulate filter 12 captures particulate materials in the exhaust gas. The occlusion-reduction type NOx catalyst 13 occludes and reduces the NOx in the exhaust gas to purify the NOx.

As shown in FIG. 1, the internal combustion engine 1A is provided with two EGR devices 20A and 20B for decreasing the NOx and improving fuel economy. The EGR devices 20A and 20B execute EGR (Exhaust Gas Recirculation) which makes one part of the exhaust gas flow back to the intake system as EGR gas. The internal combustion engine 1A uses the two EGR devices 20A and 20B differently depending on loads. A first EGR device 20A is configured as a high pressure loop EGR device. The first EGR device 20A has: an EGR passage 21 connecting the exhaust manifold 10 and the intake manifold 8; and an EGR valve 22 controlling a flow rate of the EGR gas.

A second EGR device 20B includes: an EGR passage 25 connecting the exhaust passage 6 and the intake passage 5; an EGR cooler 26 cooling the EGR gas; a bypass passage 27 bypassing the EGR cooler 26; and an EGR valve 28 controlling flow rate of the EGR gas. The second EGR device 20B is characterized by the arrangement of the bypass passage 27 and the EGR valve 28. This arrangement is for improving a collection rate of condensed water. In general, an EGR cooler and an EGR valve are arranged at the EGR passage. However, in the case of the second EGR device 20B, the EGR cooler 26 and the bypass passage 27 are provided at an area of the exhaust passage 6, the area lying on further upstream than the connecting position of the EGR passage 25 and the exhaust passage 6. The EGR valve 28 is provided at the connecting position of the exhaust passage 6 and the EGR passage 25, and is capable of changing continuously the flow rate of the EGR passage 25. The exhaust gas existing at the downstream side of the EGR valve 28 is led into a tail pipe not illustrated.

At a connecting position of the bypass passage 27 and the exhaust passage 6, a flow rate allotment changing valve 29 is provided. The flow rate allotment changing valve 29 is capable of changing continuously the allotment of flow rate between the flow rate of the EGR cooler 26 and the flow rate of the bypass passage 27. That is, the flow rate allotment changing valve 29 can change the allotment of flow rate from a state that by closing the EGR cooler 26, while the flow rate of the EGR cooler 26 is zero, full quantity of the exhaust gas flows through the bypass passage 27, to a state that by closing the bypass passage 27, while the flow rate of the bypass passage 27 is zero, full quantity of the exhaust gas flows through the EGR cooler 26.

The EGR cooler 26 uses, as refrigerant, cooling water of the internal combustion engine 1A and lowers the temperature of the EGR gas by heat exchange between the refrigerant and the warm exhaust gas. The temperature of the EGR gas lowers whereby moisture in the EGR gas is condensed. Therefore, the condensed water is generated in the EGR cooler 26. The generation quantity of the condensed water correlates with the flow rate of the exhaust gas flowing through the EGR cooler 26. Therefore, the bypass passage 27 and the flow rate allotment changing valve 29, which change the flow rate of the exhaust gas flowing through the EGR cooler 26, correspond to a condensed-water generation quantity controlling device of the present invention.

The internal combustion engine 1A is provided with a condensed water treatment device 30 for collecting and treating the condensed water generated in the EGR cooler 26. The condensed water treatment device 30 has: a condensed water tank 31 where condensed water CW is stored; and a condensed water supply mechanism 32 as a condensed water supply device which supplies the condensed water CW stored in the condensed water tank 31 to the intake system of the internal combustion engine 1A. The condensed water tank 31 is provided with a water level sensor 33 which outputs a signal according to the storage water quantity (a fluid level) of the condensed water CW. The water level sensor 33 is configured so as to specify the place of the water surface by ultrasonic, for example. The condensed water supply mechanism 32 has a condensed water passage 35 connecting the condensed water tank 31 and the intake manifold 8 of the intake passage 5. The condensed water passage 35 is provided with an electric pump 36 and an injection valve 37 which injects and supply the condensed water pressured by the pump 36 into the intake passage 10. By controlling an opening valve period of the injection valve 37, the supply quantity of condensed water can be controlled.

The internal combustion engine 1A is provided with an engine control unit (ECU) 40 which is configured as a computer controlling each portion of the internal combustion engine 1A. The ECU 40 performs a main operation control for controlling a fuel injection quantity and a fuel injection timing using the fuel injection valve 3, and further the ECU 40 is also used to control the EGR devices 20A and 20B and the condensed water treatment device 30. Signals from a lot of sensors which detect various physical quantities for obtaining an operation state of the internal combustion engine 1A are inputted to the ECU 40. For example, a crank angle sensor 41, an accelerator opening degree sensor 42, and the like are provided in the internal combustion engine 1A as the sensors relating to the present invention, the crank angle sensor 42 outputting a signal according to a crank angle of the internal combustion engine 1A, the accelerator opening degree sensor 42 outputting a signal according to a pressing level (the accelerator opening degree) of the accelerator pedal 38 mounted to the internal combustion engine 1A. Theses output signals are inputted to the ECU 40. Further, the output signal of the above mentioned water level sensor is also inputted to the ECU 40.

Figure 2:
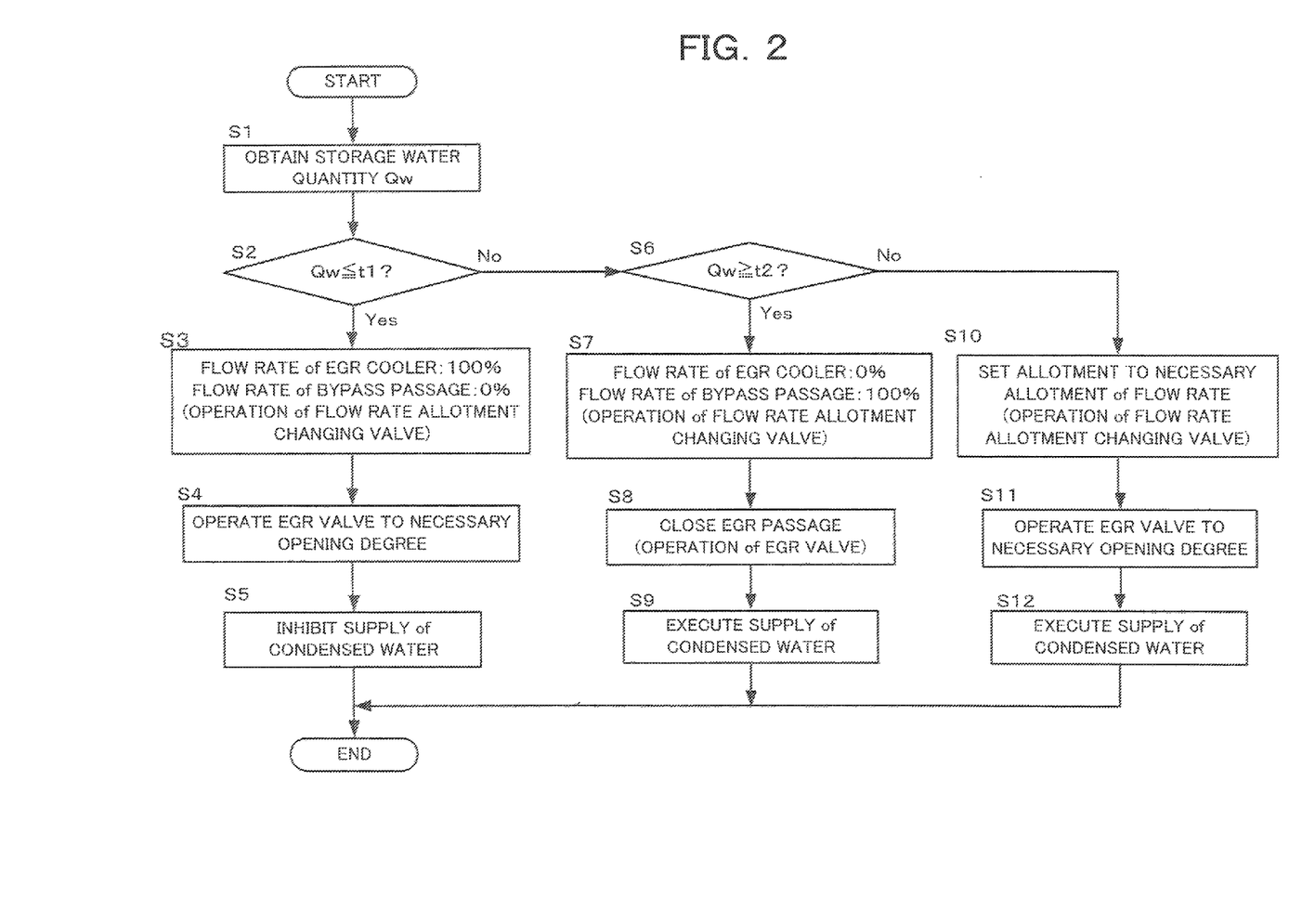
FIG. 2 is a flow chart showing an example of a control routine according to the first embodiment.

A computer program of a control routine shown in FIG. 2 is held in the ECU 40, and is read out as appropriate to be executed repeatedly in a predetermined arithmetic cycle. In step S1, the ECU 40 refers to the output signal of the water level sensor 33 to obtain the storage water quantity Qw of the condensed water tank 31. Alternatively, instead of use of the water level sensor 33, it is possible to obtain the storage water quantity Qw of the condensed water tank 31 by estimation based on a result of estimating the generation quantity of the condensed water based on the operation state of the internal combustion engine 1A and temperature information such as an atmospheric temperature and a cooling water temperature.

In step S2, the ECU 40 determines whether the storage water quantity Qw of the condensed water tank 31 is equal to or less than a lower limit t1. The lower limit t1 is set to a value corresponding to 10% of the maximum storage water quantity of the condensed water tank 31. The lower limit t1 corresponds to a predetermined value of the present invention. When the storage water quantity Qw is equal to or less than the lower limit t1, the storage water quantity Qw should be increased. Accordingly, the ECU 40 executes a storage water quantity increasing control being specified by steps S3 to S5. While, when the storage water quantity Qw is more than the lower limit t1, the ECU 40 goes to step S6.

In step S3, the ECU 40 operates the flow rate allotment changing valve 29 to close the bypass passage 27 in order to change the allotment to a state that while the flow rate of the exhaust gas in the bypass passage 27 is zero, the full quantity of the exhaust gas flows through the EGR cooler 26. That is, the flow rate of the EGR cooler 26 is set to 100% and the flow rate of the bypass passage 27 is set to 0%. Thereby, the full quantity of exhaust gas flows through the EGR cooler 26. Due to this, the generation quantity of condensed water generated in the EGR cooler 26 increases in comparison with the generation quantity of other allotments of flow rate. In step S4, the ECU 40 operates the opening degree of the EGR valve 28 so that an EGR rate is equal to an EGR rate determined depending on the operation state of the internal combustion engine 1A. In addition, when the EGR by the first EGR device 20A is also executed at the same time, the opening degree of the EGR valve 28 of the second EGR device 20B is determined in the consideration of the opening degree of the EGR valve 22. In a case where the EGR is executed, in comparison with a case where the EGR is not executed, moisture in exhaust gas increases. Accordingly, in the case where the EGR is executed, in comparison with the case where the EGR is not executed, the generation quantity of the condensed water increases. In step S5, the ECU 40 by keeping the injection valve 37 in a closing valve state, inhibits the condensed water supply mechanism 32 to supply the condensed water to the intake system of the internal combustion engine 1A. By inhibiting the supply of condensed water, the consumption of the condensed water of the condensed water tank 31 decreases.

In this way, the generation quantity of condensed water increases by execution of the steps S3 and S4, and the consumption of condensed water decreases by execution of the step S5. Accordingly, the ECU 40 executes the storage water increasing control specified by the steps S3 to S5 whereby in a case where the storage water quantity of the condensed water tank 31 should be increased it is possible to promote increase of the storage water quantity. The ECU 40 functions as a storage-water-quantity increase controlling device of the present invention by executing the steps S3 to S5.

In step S6, the ECU 40 determines whether the storage water quantity Qw of the condensed water tank 31 is equal to or more than an upper limit t2. The upper limit t2 is set to a value bigger than the lower limit t1. For example, the upper limit t2 is set to a value corresponding to 80% of the maximum storage water quantity of the condensed water tank 31. In a case where the storage water quantity Qw is equal to or more than the upper limit t2, that is, in a case where the storage water quantity Qw is more than the lower limit t1 and also equal to or more than the upper limit t2, the storage water quantity Qw should be decreased. Accordingly, the ECU 40 executes a storage water quantity decreasing control specified by steps S7 to S9. On the other hand, in a case where the storage water quantity Qw is less than the upper limit t2, the ECU 40 goes to step S10.

In step S7, the ECU 40 operates the flow rate allotment changing valve 29 to close the EGR cooler 26 in order to change the allotment to a state that while the flow rate of the EGR cooler 26 is zero, the full quantity of the exhaust gas flows through the bypass passage 27. That is, the flow rate of the EGR cooler 26 is set to 0% and the flow rate of the bypass passage 27 is set to 100%. Thereby, the full quantity of the exhaust gas bypasses the EGR cooler 26. Due to this, the generation quantity of condensed water generated in the EGR cooler 26 decreases or the generation stops. In step S8, the ECU 40 operates the opening degree of the EGR valve 28 so that the EGR passage 25 is closed. Thereby, the EGR by the second EGR device 20B is stopped. Contrary to the above mentioned case, in a case where the EGR is not executed, moisture in the exhaust gas decreases. Accordingly, the generation quantity of the condensed water decreases in a case where the EGR is not executed, in comparison with a case where the EGR is executed. In step S9, the ECU 40 operates the opening valve period of the injection valve 37 as appropriate to supply the condensed water to the intake system of the internal combustion engine 1A. Thereby, the consumption of the condensed water in the condensed water tank 31 increases.

In this way, the generation quantity of condensed water decreases by execution of the steps S7 and S8, and the consumption of the condensed water increases by execution of the step S9. Accordingly, the ECU 40 executes the storage water decreasing control specified by the steps S7 to S9 whereby in a case where the storage water quantity of the condensed water tank 31 should be decreased it is possible to promote decrease of the storage water quantity. The ECU 40 functions as a storage-water-quantity decrease controlling device of the present invention by executing the steps S7 to S9.

In a case where a negative determination is obtained in each of the steps S2 and S6, the storage water quantity Qw of the condensed water tank 31 is more than the lower limit t1 and also less than the upper limit t2. This means that the storage water quantity Qw is kept within an appropriate range. As it is not necessary to increase or decrease the storage water quantity Qw on purpose, the ECU 40 executes a normal control specified by steps S10 to S12. In step S10, the ECR 40 operates the flow rate allotment changing valve 29 so that the allotment between the flow rate of the EGR cooler 26 and the flow rate of the bypass passage 27 is controlled to become equal to a necessary allotment of flow rate appropriate for the operation state of the internal combustion engine 1A. In step S11, the ECU 40 operates, as with the step S4, the opening degree of the EGR valve 28 so that the EGR rate becomes equal to an EGR rate determined depending on the operation state of the internal combustion engine 1A. In step S12, the ECU 40 operates, as with the step S9, the opening valve period of the injection valve 37 as appropriate to supply the condensed water to the intake system of the internal combustion engine 1A.

According to the first embodiment, when the storage water quantity Qw of the condensed water tank 31 is equal to or less than the lower limit t1, the storage water quantity increase control is executed, and when the storage water quantity Qw is more than the lower limit t1 and also equal to or more than the upper limit t2 the storage water decrease control is executed. Accordingly, by setting the lower limit t1 and the upper limit t2 appropriately, it is possible to manage appropriately the storage water quantity of the condensed water tank 31. Further, in the first embodiment, since the lower limit t1 and the upper limit t2 which are different from each other are set, it is possible to avoid frequent change between the storage water decrease control and the storage water increase control. Therefore, it is possible to contribute to a stable operation of the internal combustion engine 1A, which is a good point. In addition, the first embodiment may be changed as follows: the lower limit t1 and the upper limit t2 are integrated to make one predetermined value; when the storage water quantity Qw is equal to or less than the predetermined value the storage water quantity increase control is executed; and when the storage water quantity Qw is more than the predetermined value the storage water quantity decrease control is executed. Further, in the first embodiment, by leading the full quantity of the exhaust gas into the EGR cooler 26, a collection efficiency of the condensed water can be improved. Thereby, there is a good point on a physical configuration.

A Second Embodiment

Figure 3A:
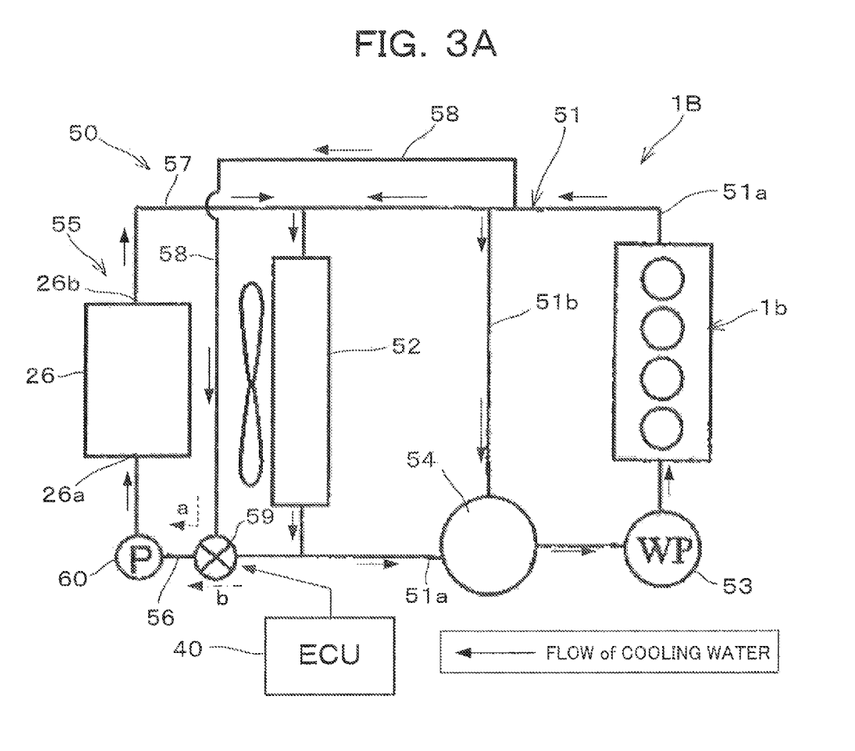
FIG. 3A is a configuration diagram showing an outline of a cooling system build into an internal combustion engine according to a second embodiment.
Figure 3B:
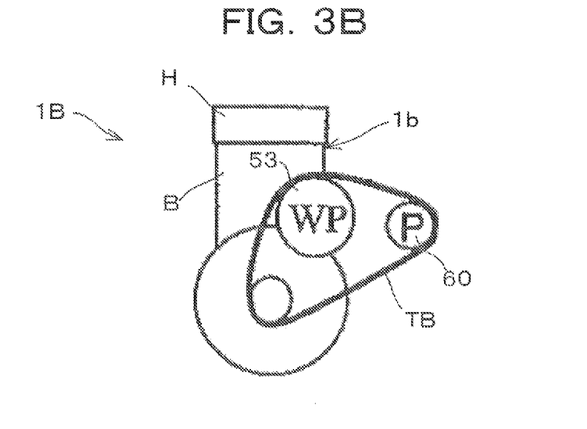
FIG. 3B is a diagram showing an example of a driving method of a pump included in the cooling system of FIG. 3A.

Next, a second embodiment of the present invention will be explained in reference to FIGS. 3A, 3B, and 4. The second embodiment is applied to an internal combustion engine 1B where a cooling system shown in FIGS. 3A and 3B is built. The configuration other than the cooling system of the internal combustion engine 1B is similar to the configuration of the internal combustion engine 1A shown in FIG. 1. Therefore, duplicated explanation is omitted.

The internal combustion engine 1B has an engine main body 1b including a cylinder block B, a cylinder head H, and the like. The cooling system 50 includes a cooling pathway 51, a radiator 52, a water pump 53, a thermostat 54, and a cooling mechanism 55. The cooling pathway 51 is provided for circulating cooling water as refrigerant through each portion of the internal combustion engine 1B. The radiator 52 is provided for cooling the cooling water. The water pump 53 is provided for pumping the cooling water. The thermostat 54 is provided for switching a pathway of the cooling water. The cooling mechanism 55 is provided for supplying the cooling water to the EGR cooler 26. The cooling pathway 51 includes a main path 51a and a diverging path 51b. The main path 51a connects circularly the engine main body 1b and the radiator 52. The diverging path 51b diverges from the main path 51a at the downstream side of the engine main body 1b and joins the main path 51a at the upstream side of the engine main body 1b. At the connecting position of the diverging path 51b, the thermostat 54 is arranged. As well known, by operation of the thermostat 54, a state of circulating cooling water is switched between a state that the cooling water circulates through the main path 51a and a state that the cooling water circulates via the diverging path 51b while bypassing the radiator 52.

The cooling mechanism 55 includes an inflow path 56, an outflow path 57, and a diverging path 58. The inflow path 56 connects the main path 51a at the downstream side of the radiator 52 with a refrigerant entrance 26a of the EGR cooler 26. The outflow path 57 connects the main path 51a at the upstream side of the radiator 52 with a refrigerant exit 26b of the EGR cooler 26. The diverging path 58 diverges from the main path 51a at the downstream side of the engine main body 1b and joins the inflow path 56. At the connecting position of the diverging path 58, a pathway switching valve 59 for switching a pathway leading the cooling water to the EGR cooler 26 is provided. A pump 60 is provided to the inflow path 56 existing between the pathway switching valve 59 and the refrigerant entrance 26a of the EGR cooler 26. As shown in FIG. 3B, the pump 60 and the water pump 53 are driven by a shared timing belt TB where the torque of the internal combustion engine 1B is transmitted. However, the driving method shown in FIG. 3B is one example. At least one of the pumps 53 and 60 may be changed to an electric pump.

The pathway switching valve 59 is configured as a three-way valve which is allowed to operate between a position a for flowing the cooling water in a direction of an arrow shown by a broken line and a position b for flowing the cooling water in a direction of an arrow shown by a dashed line. The operation of the pathway switching valve 59 is controlled by the ECU 40. When the pathway switching valve 59 is operated up to the position a, the inflow path 56 and the diverging path 58 are opened, and the cooling water after cooling the engine main body 1b is led into the EGR cooler 26 while bypassing the radiator 52. Accordingly, a pathway obtained by combining the inflow path 56 and the diverging path 58 in a state that the pathway switching valve 59 has been operated up to the position a, corresponds to a high temperature pathway of the present invention. On the other hand, when the pathway switching valve 59 is operated up to the position b, the inflow path is opened while the diverging path 58 is closed. Due to this, the cooling water which has passed the radiator 52 after passing the engine main body 1b is led into the EGR cooler 26. Accordingly, the inflow path 56 in a state that the pathway switching valve 59 has been operated up to the position b corresponds to a low temperature pathway of the present invention.

The pathway switching valve 59 is operated up to the position a whereby the cooling water having a high temperature is led into the EGR cooler 26. Due to this, the generation quantity of condensed water decreases. On the other hand, the pathway switching valve 59 is operated up to the position b whereby the cooling water having a low temperature is led into the EGR cooler 26. Due to this, the generation of condensed water increases. Accordingly, it is possible to control the generation quantity of condensed water by the operation of the pathway switching valve 59. Thereby, the pathway switching valve 59 corresponds to a condensed-water generation quantity controlling device of the present invention.

Figure 4:
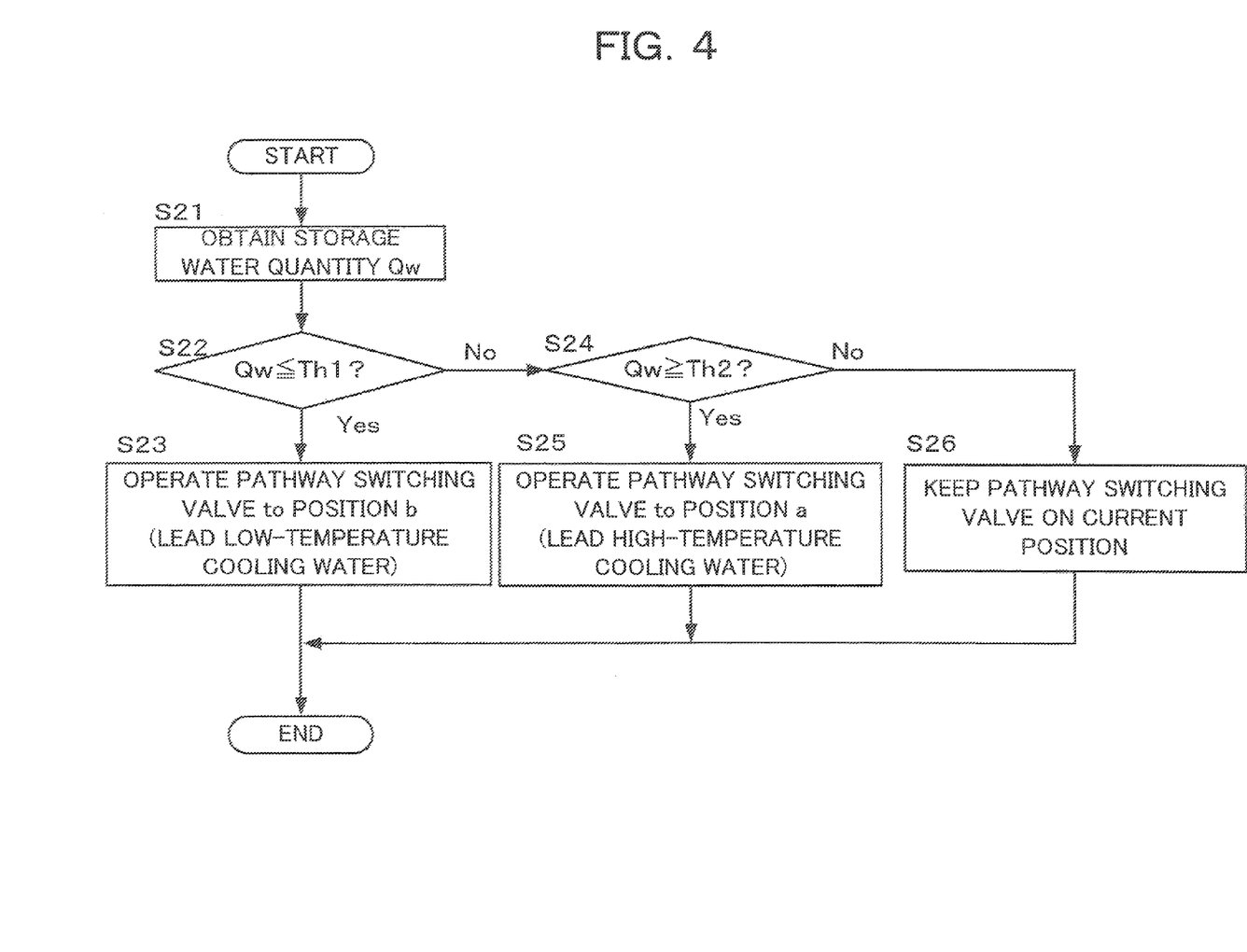
FIG. 4 is a flow chart showing an example of a control routine according to the second embodiment.

A computer program of a control routine shown in FIG. 4 is held in the ECU 40, and read out as necessary to be executed repeatedly in a predetermined arithmetic cycle. In step S21, the ECU 40 obtains the storage water quantity Qw of the condensed water tank 31 in reference to the output signal of the water level sensor 33. However, as with the first embodiment, the storage water quantity Qw may be obtained by the estimation. In step S22, the ECU 40 determines whether the storage water quantity Qw of the condensed water tank 31 is equal to or less than a first threshold value Th1. The first threshold value Th1 is set to a value corresponding to 40% of the maximum storage water quantity of the condensed water tank 31. The first threshold value Th1 corresponds to a predetermined value of the present invention. In a case where the storage water quantity Qw is equal to or less than the first threshold value Th1, the ECU 40 determines that the storage water quantity Qw should be increased and goes to step S23 to execute a storage water quantity increasing control by operating the pathway switching valve 59 up to the position b. Thereby, the generation quantity of condensed water generated in the ECR cooler 26 increases. The ECU 40 functions as a storage-water-quantity increase controlling device by executing the step S23. On the other hand, in a case where the storage water quantity Qw is more than the first threshold value Th1, the ECU 40 goes to step S24.

In step S24, the ECU 40 determines whether the storage water quantity Qw of the condensed water tank 31 is equal to or more than a second threshold value Th2. The second threshold value Th2 is set to a value bigger than the first threshold value Th1. For example, a value corresponding to 60% of the maximum storage water quantity of the condensed water tank 31 could be set as the second threshold value Th2. In a case where the storage water quantity Qw is equal to or more than the second threshold value Th2, that is, in a case where the storage water quantity Qw is more than the first threshold value Th1 and also equal to or more than the second threshold value Th2, the ECU 40 determines that the storage water quantity Qw should be decreased, and goes to step S25 to execute a storage water quantity decreasing control by operating the pathway switching valve 59 up to the position a. Thereby, the generation quantity of condensed water generated in the ECU cooler 26 decreases. The ECU 40 functions as a storage-water-quantity decrease controlling device by executing the step S25. On the other hand, in a case where the storage water quantity Qw is less than the second threshold value Th2, the ECU 40 goes to step S26. In the step S26, The ECU 40 keeps the pathway switching valve 59 on the current position and ends the routine of this time.

According to the second embodiment, by the execution of the step S23 the generation quantity of condensed water increases. Due to this, in a case where the storage water quantity of the condensed water tank 31 should be increased, it is possible to promote the increase of the storage water quantity. In addition, by the execution of the step S25 the generation quantity of condensed water decreases. Due to this, in a case where the storage water quantity of the condensed water tank 31 should be decreased, it is possible to promote the decrease of the storage water quantity. Accordingly, the first threshold value Th1 and the second threshold value Th2 are set as appropriate whereby it is possible to manage appropriately the storage water quantity of the condensed water tank 31. Further, in the second embodiment, the first threshold value Th1 and the second threshold value Th2 are differently from each other whereby it is possible to avoid frequent switch of the position of the pathway switching valve 59. Therefore, it is possible to contribute to a stable operation of the internal combustion engine 1A, which is a good point. In addition, as with the first embodiment, the second embodiment may be changed as follows: the two threshold values Th1 and Th2 are integrated to make one predetermined value; when the storage water quantity Qw is equal to or less than the predetermined value the pathway switching valve 59 is operated to the position b; and when the storage water quantity Qw is more than the predetermined value the pathway switching valve 59 is operated to the position a. Further, it is possible to execute the control of the first embodiment shown in FIG. 2 as well as the control of the second embodiment shown in FIG. 4.

A Third Embodiment

Figure 5:
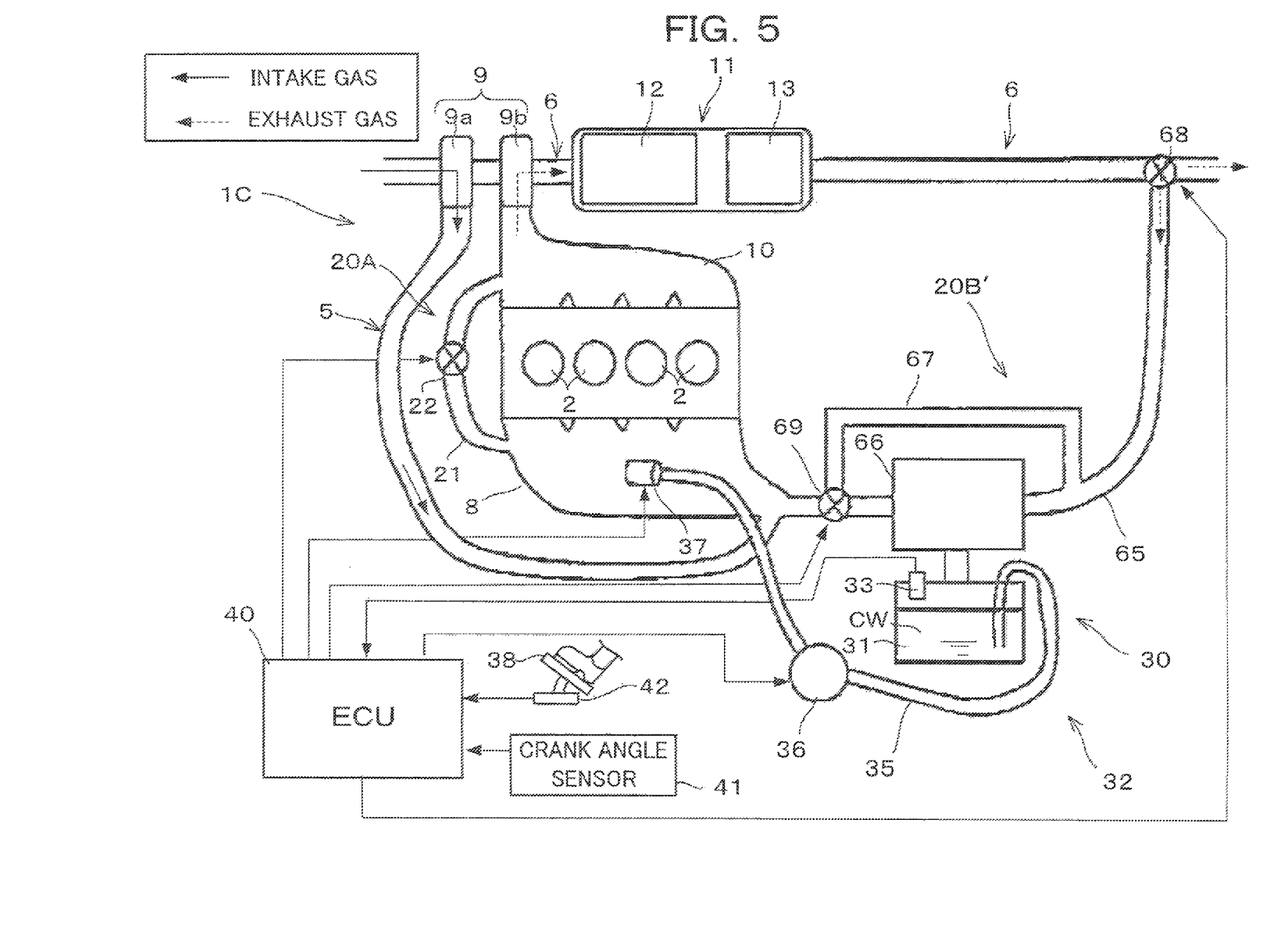
FIG. 5 is a diagram showing a whole configuration of an internal combustion engine according to a third embodiment.

Next, a first embodiment of the present invention will be explained in reference to FIG. 5. The third embodiment is the same as the first embodiment except a point that the configuration of the internal combustion engine 1C. In FIG. 5, the same symbols as the first embodiment are assigned to the constructions shared with the first embodiment, and the explanations of the constructions are omitted. A second EGR device 20B' provided to the internal combustion engine 1C includes: an EGR passage 65 connecting the exhaust passage 6 and the intake manifold 8 of the intake passage 5; an EGR cooler 66 for cooling the EGR gas; a bypass passage 67 bypassing the EGR cooler 66; and an EGR valve for controlling the flow rate of the EGR gas. The EGR valve 68 is provided to a connecting position of the outtake passage 6 and the EGR passage 65, and is allowed to change continuously the flow rate led into the EGR passage 65. The exhaust gas flowing downstream further than the EGR valve 68 is led into a tail pipe not illustrated.

At a connecting position of the bypass passage 67 and the EGR passage 65, a flow rate allotment changing valve 69 is provided. The flow rate allotment changing valve 69 is allowed to change continuously the allotment of flow rate between the flow rate of the EGR cooler 66 and the flow rate of the bypass passage 67. That is, the flow rate allotment changing valve 69 is configured so as to change the allotment of flow rate from a state that, while closing the EGR cooler 66 which makes the flow rate in the EGR cooler 66 zero, the full quantity of the exhaust gas flowing through the EGR passage 65 flows through the bypass passage 67 to a state that, while closing the bypass passage 67 which makes the flow rate zero, the full quantity of the exhaust gas flowing through the EGR passage 65 flows through the EGR cooler 66. The condensed water generated in the EGR cooler 66 is collected and treated by the condensed water treatment device 30. The generation quantity of condensed water correlates with the flow rate of the exhaust gas flowing through the EGR cooler 66. Due to this, the bypass passage 67 and the flow rate allotment changing valve 69 which change the flow rate of the exhaust gas flowing through the EGR cooler 66, correspond to a condensed-water generation quantity controlling device of the present invention.

The control which the ECU 40 should execute using the internal combustion engine 1C as an object is the same as the control of the first embodiment shown in FIG. 2. Accordingly, the ECU 40 functions as a storage-water-quantity decrease controlling device and a storage-water-quantity increase controlling device of the present invention by executing the control routine shown in FIG. 2. With respect to a concrete explanation of the treatment executed by the ECU 40, the explanation of the first embodiment is referenced. Also in the third embodiment, as with the first embodiment, in a case where the storage water quantity Qw of the condensed water tank 31 is equal to or less than the lower limit t1, the storage water increasing control is executed, and in a case where the storage water quantity Qw is more than the lower limit t1 and also equal to or less than the upper limit t2, the storage water decreasing control is executed. Due to this, when the lower limit t1 and the upper limit t2 are set as appropriate, whereby it is possible to manage appropriately the storage water quantity of the condensed water tank 31. In addition, when the cooling system in the second embodiment is built into the internal combustion engine 1C in the third embodiment, it is possible to execute the control shown in FIG. 2 with executing the control shown in FIG. 4.

The present invention is not limited to the above embodiments, and can be executed as various kinds of embodiments within a range of substance of the present invention. In the above embodiments, treated is the condensed water generated in the EGR cooler. However, it is also possible to execute the present invention for treatment of condensed water generated in an intake passage. That is, the present invention can be applied for treatment of condensed water generated in any part of an exhaust system of an internal combustion engine. In each of the above embodiments, the condensed water is supplied to the intake system of the internal combustion engine (the intake passage 5). However, A part which condensed water is supplied to is not limited to the intake system. For example, the following embodiment is also available. Condensed water is supplied to an exhaust system, and the condensed water is led into cylinders within a valve overlap period by using a method similar to, so called, an internal EGR.

Further, it is also possible to change to an embodiment that condensed water is supplied to various kinds of devices mounted to an internal combustion engine. For example, the present invention can be executed in an embodiment that condensed water is supplied to various kinds of devices such as an inter cooler for cooling air pressured by a turbocharger, and a thermal storage device for heating lubricating oil or intake gas in an internal combustion engine. Further, condensed water can be supplied to a related device relating to an internal combustion engine. For example, it is possible to execute the present invention in an embodiment that condensed water is supplied to various kinds of devices such as an air-conditioning system using heat generated in an internal combustion engine or a driving device to which an output torque of the internal combustion engine is transmitted. Instead of the above embodiment in which the supply of condensed water is inhibited, it is possible to decrease the supply quantity of condensed water.

In each of the above embodiments, when the generation quantity of condensed water is increased or decreased, a first flow rate which is any one of the flow rate of the EGR cooler and the flow rate of the bypass passage is set to 0% and a second flow rate which is the other one of them is set to 100%. However, this allotment of flow rate is just one example. It is also possible to execute the present invention in an embodiment that the allotment of flow rate is disproportioned between the first flow rate and the second flow rate. The condensed-water generation quantity controlling device is not limited to each of the above embodiments. For example, since it is possible to control the generation quantity of condensed water by increasing or decreasing the EGR quantity, the present invention can be also executed in an embodiment that the EGR valve which is used for controlling the EGR quantity is provided as the condensed-water generation quantity controlling device. In the first and the third embodiments, the supply and inhibition of condensed water are executed with the control of the generation quantity of the condensed water. However, even if only any one of these operations is executed singularly, it is possible to increase or decrease the storage water quantity of the condensed water tank. Accordingly, the first or the third embodiment may be changed to an embodiment that only any one of these operations is executed singularly.

The internal combustion engine in each of the above embodiments is configured as a diesel engine. However, the engine as an object which the present invention is applied to is not limited to a diesel engine. Accordingly, the present invention is also possible to be applied to a spark ignition type internal combustion engine. It is not determined whether the present invention is applied to an internal combustion engine or not depending on whether the internal combustion engine has a turbocharger or not. Accordingly, it is also possible to apply the present invention to a natural aspiration type internal combustion engine. In a case where the present invention is applied to the natural aspiration type internal combustion engine, it is possible to supply condensed water to an intake system by using negative pressure in an intake passage. Therefore, it is possible to omit a pump for pressing condensed water used in the above embodiments.

The invention claimed is:

1. A condensed water treatment device for an internal combustion engine, the condensed water treatment device comprising:
    a condensed water tank which stores condensed water generated in an exhaust system of the internal combustion engine;
    a condensed water supply device including a condensed water passage which supplies the condensed water stored in the condensed water tank to the internal combustion engine or a related device relating to the internal combustion engine;
    a condensed-water generation quantity controlling device controlling a generation quantity of the condensed water generated in the exhaust system; and
    a computer, the computer by executing a computer program functioning as:
        a storage-water-quantity decrease controlling device which is configured to control at least one of the condensed water supply device and the condensed-water generation quantity controlling device so that when a storage water quantity of the condensed water tank is more than a predetermined value the storage water quantity decreases; and
        a storage-water-quantity increase controlling device which is configured to control at least one of the condensed water supply device and the condensed-water generation quantity controlling device so that when the storage water quantity is equal to or less than the predetermined value the storage water quantity increases,
    wherein:
    the internal combustion engine comprises:
        an engine main body;
        an EGR passage which leads exhaust gas flowing through the exhaust system to an intake system as EGR gas;
        an EGR cooler which cools the EGR gas;
        a radiator which cools refrigerant having passed through the engine main body; and
        a cooling system including a low temperature pathway for leading to the EGR cooler, the refrigerant having passed through the radiator after passing through the engine main body and a high temperature pathway for leading to the EGR cooler, the refrigerant having bypassed the radiator after passing through the engine main body,
    the condensed water tank stores condensed water generated in the EGR cooler as the condensed water generated in the exhaust system,
    the condensed-water generation quantity controlling device includes a pathway switching valve included in the cooling system, the pathway switching valve switching between the low temperature pathway and the high temperature pathway, and a cooling pathway for leading the refrigerant to the EGR cooler,
    the storage-water-quantity decrease controlling device, which the computer functions as, is configured to control the pathway switching valve so that the cooling pathway is switched to the high temperature pathway, in a case where the storage water quantity is more than the predetermined value, and
    the storage-water-quantity increase controlling device, which the computer functions as, is configured to control the pathway switching valve so that the cooling pathway is switched to the low temperature pathway, in a case where the storage water quantity is equal to or less than the predetermined value.

2. The condensed water treatment device according to claim 1, wherein:
    the condensed-water generation quantity controlling device further includes a bypass passage leading the EGR gas to make the EGR gas bypass the EGR cooler and a flow rate allotment changing valve changing allotment of flow rate between flow rate of the bypass passage and flow rate of the EGR cooler,
    the condensed-water-quantity decrease controlling device, which the computer functions as, is further configured to control the condensed water supply device so that the condensed water is supplied to the internal combustion engine or the related device and also to control the flow rate allotment changing valve so that the allotment of flow rate is changed to a state that the flow rate of the EGR cooler is less than the flow rate of the bypass passage, in a case where the storage water quantity is more than the predetermined value, and
    the condensed-water-quantity increase controlling device, which the computer functions as, is further configured to control the condensed water supply device so that supply of the condensed water to the internal combustion engine or the related device is inhibited or supply quantity of the condensed water decreases and also to control the flow rate allotment changing valve so that the allotment of flow rate is changed to a state that the flow rate of the EGR cooler is more than the flow rate of the bypass passage, in a case where the storage water quantity is equal to or less than the predetermined value.

* * * * *